United States Patent
Zheng et al.

(10) Patent No.: US 12,279,242 B2
(45) Date of Patent: Apr. 15, 2025

(54) DETERMINING A TRANSMISSION FREQUENCY BAND

(71) Applicant: HUAWEI TECHNOLOGIES CO., LTD., Guangdong (CN)

(72) Inventors: Juan Zheng, Beijing (CN); Chaojun Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 437 days.

(21) Appl. No.: 17/679,674

(22) Filed: Feb. 24, 2022

(65) Prior Publication Data

US 2022/0183008 A1 Jun. 9, 2022

Related U.S. Application Data

(63) Continuation of application No. PCT/CN2020/110596, filed on Aug. 21, 2020.

(30) Foreign Application Priority Data

Aug. 30, 2019 (CN) .......................... 201910819083.X

(51) Int. Cl.
*H04W 72/04* (2023.01)
*H04W 28/20* (2009.01)
(Continued)

(52) U.S. Cl.
CPC ....... *H04W 72/0453* (2013.01); *H04W 28/20* (2013.01); *H04W 88/06* (2013.01)

(58) Field of Classification Search
CPC . H04W 72/0453; H04W 72/23; H04W 72/51; H04W 28/20; H04W 88/06
(Continued)

(56) References Cited

U.S. PATENT DOCUMENTS

2015/0365945 A1 12/2015 Morioka et al.
2019/0149421 A1* 5/2019 Jin .................... H04W 36/0077
370/331
(Continued)

FOREIGN PATENT DOCUMENTS

CN 103220809 A 7/2013
CN 103621147 A 3/2014
(Continued)

OTHER PUBLICATIONS

Nokia (R1-1908930, "Discussion on mandatory BWP sizes", Aug. 26-30, 2019), (Year: 2019).*

(Continued)

*Primary Examiner* — Maharishi V Khirodhar
(74) *Attorney, Agent, or Firm* — Fish & Richardson P.C.

(57) ABSTRACT

A data transmission method and apparatus are provided. The method includes: A terminal device determines a first frequency band, receives first information from a network device, where the first information is used to indicate a first transmission frequency band, determines the first transmission frequency band based on the first information, and transmits data to the network device in the first transmission frequency band. A bandwidth of the first frequency band is greater than a maximum channel bandwidth supported by the terminal device. The first transmission frequency band is used by the terminal device to transmit data. The first frequency band includes the first transmission frequency band.

16 Claims, 5 Drawing Sheets

(51) Int. Cl.
*H04W 72/0453* (2023.01)
*H04W 76/00* (2018.01)
*H04W 88/08* (2009.01)
*H04W 88/06* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0053825 A1* | 2/2020 | Hwang | ................ | H04W 76/28 |
| 2020/0100129 A1* | 3/2020 | Sun | ..................... | H04W 72/046 |
| 2020/0221308 A1* | 7/2020 | Liao | .................. | H04W 74/0833 |
| 2020/0367050 A1* | 11/2020 | Yang | ..................... | H04L 5/0092 |
| 2021/0127367 A1 | 4/2021 | Yi | | |

FOREIGN PATENT DOCUMENTS

| | | | | |
|---|---|---|---|---|
| CN | 104956753 A | 9/2015 | | |
| CN | 108633059 A | 10/2018 | | |
| CN | 108702266 A | 10/2018 | | |
| CN | 109151912 A | 1/2019 | | |
| EP | 3629619 A1 | 4/2020 | | |
| WO | 2018194412 A1 | 10/2018 | | |
| WO | 2019022494 A2 | 1/2019 | | |
| WO | 2019095212 A1 | 5/2019 | | |
| WO | 2019097828 A1 | 5/2019 | | |
| WO | WO-2019104282 A1 * | 5/2019 | ......... | H04L 25/0202 |

OTHER PUBLICATIONS

3GPP TS 38.101-1 V16.0.0 (Jun. 2019), "3rd Generation Partnership Project; Technical Specification Group Radio Access Network; NR; User Equipment (UE) radio transmission and reception; Part 1: Range 1 Standalone (Release 16)," Jun. 2019, 268 pages.
Ericsson, "NR for Industrial Sensors (draft SID)," 3GPP TSG RAN Meeting #83, RP-190432, Shenzhen, China, Mar. 18-21, 2019, 4 pages.
Office Action issued in Chinese Application No. 201910819083.X on Aug. 11, 2021, 23 pages (with English translation).
PCT International Search Report and Written Opinion issued in International Application No. PCT/CN2020/110596 on Oct. 28, 2020, 17 pages (with English translation).
Intel Corporation, "On DL and UL data scheduling," 3GPP TSG RAN WG1 Meeting #88, R1-1705032, Spokane, USA, Apr. 3-7, 2017, 6 pages.
Office Action issued in Chinese Application No. 201910819083.X on Jun. 24, 2022, 8 pages (with English translation).
Extended European Search Report issued in European Application No. 20856727.1 on Aug. 16, 2022, 7 pages.

* cited by examiner

DETERMINING A TRANSMISSION FREQUENCY BAND

CROSS-REFERENCE TO RELATED APPLICATIONS

This application is a continuation of International Application No. PCT/CN2020/110596, filed on Aug. 21, 2020, which claims priority to Chinese Patent Application No. 201910819083.X, filed on Aug. 30, 2019. The disclosures of the aforementioned applications are hereby incorporated by reference in their entireties.

TECHNICAL FIELD

This application relates to the field of communication technologies, and in particular, to a data transmission method and apparatus.

BACKGROUND

5th generation (5th-generation, 5G) mobile communication technology new radio (new radio, NR) is a global 5G standard designed for a brand-new orthogonal frequency division multiplexing (orthogonal frequency division multiplexing, OFDM) air interface. It is also a very important foundation for a next-generation cellular mobile technology. Services of the 5G technology are diversified and include enhanced mobile broadband (enhanced mobile broadband, eMBB) services, ultra-reliable low-latency communication (ultra-reliable low-latency communication, URLLC) services, and massive machine-type communications (massive machine-type communications, mMTC) services.

Machine-to-machine communication is a basis of internet of everything. For currently implemented machine-to-machine communication, a data transmission amount of a terminal device is small, and a latency requirement is low. For this reason, from a perspective of meeting a data transmission rate, a bandwidth of the terminal device is small. For example, an MTC terminal device and a narrowband internet of things (narrowband internet of things, NB-IoT) terminal device in a long term evolution (long term evolution, LTE) system respectively have a bandwidth capability of only 1.4 MHz and only 180 kHz or 200 kHz.

Currently, in an NR system, a data transmission rate in some research scenarios is generally higher than a data transmission rate of the 1.4 MHz MTC terminal device and the 180 kHz NB-IoT terminal device in the LTE system. A bandwidth capability of a terminal device in the machine-to-machine communication needs to be larger. However, considering a relationship between bandwidths and terminal device costs (a smaller bandwidth indicates lower device costs), the bandwidth capability of the terminal device in the machine-to-machine communication does not need to be excessively large. Therefore, more attention has been paid to the research on such terminal devices. Compared with LTE machine terminal devices, such terminal devices have a higher bandwidth capability but may be considered as terminal devices with a low bandwidth capability in the NR system. For example, a terminal device with a bandwidth capability of 3.6 MHz is a device with a high bandwidth capability in the LTE system, but a device with a low bandwidth capability in the NR system.

Currently, bandwidth capabilities of terminal devices in the NR system are also diversified. For example, as specified in the 3rd generation partner project (3rd generation partner project, 3GPP) protocol (3GPP TS 38.101-1), the bandwidth capabilities of the terminal devices in the 5G system range from 5 MHz to 100 MHz. Although the 5G system has a large terminal bandwidth range, some terminal devices with low bandwidth capabilities (for example, a terminal device whose maximum transmission bandwidth is 5 MHz or 10 MHz) are not specially designed based on bandwidths. Consequently, terminal devices of this type have low data transmission efficiency.

SUMMARY

This application provides a data transmission method and apparatus, to improve data transmission efficiency of a terminal device with a low bandwidth capability.

According to a first aspect, this application provides a data transmission method. The method includes: A terminal device determines a first frequency band, receives first information from a network device, where the first information is used to indicate a first transmission frequency band, determines the first transmission frequency band based on the first information, and transmits data to the network device in the first transmission frequency band. A bandwidth of the first frequency band is greater than a maximum channel bandwidth supported by the terminal device. The first transmission frequency band is used by the terminal device to transmit data. The first frequency band includes the first transmission frequency band. A bandwidth of the first transmission frequency band is smaller than or equal to the maximum channel bandwidth supported by the terminal device.

According to the foregoing method, the network device can dynamically schedule a terminal device with a low bandwidth capability within a larger frequency resource range, thereby obtaining a larger frequency selective scheduling gain and improving data transmission efficiency.

In a possible design, the bandwidth of the first frequency band is smaller than or equal to a carrier bandwidth.

In a possible design, a specific method used by the terminal device to determine the first frequency band may be: The terminal device receives second information from the network device, where the second information is used to indicate the first frequency band; and the terminal device determines the first frequency band based on the second information; or the first frequency band is predefined.

According to the foregoing method, the terminal device can accurately determine the first frequency band, so that the terminal device can transmit data.

In a possible design, the terminal device may receive third information from the network device, where the third information is used to indicate a second frequency band; and the terminal device determines the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band.

According to the foregoing method, the terminal device can accurately determine the second frequency band, so as to accurately transmit data subsequently.

In a possible design, the third information may include at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

According to the foregoing method, the second frequency band can be accurately indicated by using the third information.

In a possible design, the third information includes a first index, and the first index corresponds to the second frequency band in the first frequency band; and a specific method used by the terminal device to determine the second frequency band based on the third information may be: The terminal device determines the second frequency band based on the first index and a correspondence between the first index and the second frequency band.

According to the foregoing method, the second frequency band can be accurately indicated by using the third information.

In a possible design, the terminal device determines the second frequency band based on at least one of the following: a time location at which the terminal device transmits data, a corresponding hybrid automatic repeat request HARQ process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band. The second frequency band is included in the first frequency band, a bandwidth of the second frequency band is smaller than or equal to the maximum channel bandwidth supported by the terminal device, and the first transmission frequency band is a part or all of the second frequency band.

According to the foregoing method, the terminal device can accurately determine the second frequency band, so as to accurately transmit data subsequently.

In a possible design, the second frequency band may be predefined.

In a possible design, the data is PDSCH data.

In a possible design, the terminal device obtains a first frequency band set, where the first frequency band set includes at least one of frequency bands corresponding to different data transmission types; and a specific method used by the terminal device to determine the first frequency band may be: The terminal device determines the first frequency band based on a data transmission type and the first frequency band set.

According to the foregoing method, the terminal device can accurately determine the first frequency band, so as to transmit data subsequently.

In a possible design, the first frequency band may be a bandwidth part (bandwidth part, BWP).

According to a second aspect, this application provides a data transmission method. The method includes: A network device sends first information to a terminal device, where the first information is used to indicate a first transmission frequency band. The network device receives data from the terminal device in the first transmission frequency band. The first transmission frequency band is used by the terminal device to transmit data, the first transmission frequency band is included in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device.

According to the foregoing method, the network device can dynamically schedule a terminal device with a low bandwidth capability within a larger frequency resource range, thereby obtaining a larger frequency selective scheduling gain and improving data transmission efficiency.

In a possible design, the bandwidth of the first frequency band is smaller than or equal to a carrier bandwidth.

In a possible design, the network device sends second information to the terminal device, where the second information is used to indicate the first frequency band. In this way, the terminal device can accurately determine the first frequency band, so as to transmit data subsequently.

In a possible design, the network device sends third information to the terminal device, where the third information is used to indicate a second frequency band, the second frequency band is included in the first frequency band, a bandwidth of the second frequency band is smaller than or equal to the maximum channel bandwidth supported by the terminal device, and the first transmission frequency band is a part or all of the second frequency band. In this way, the terminal device can accurately determine the second frequency band, so as to accurately transmit data subsequently.

In a possible design, the second information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

According to the foregoing method, the second frequency band can be accurately indicated by using the third information.

In a possible design, the second information includes a first index, and the first index corresponds to the second frequency band in the first frequency band. In this way, the second frequency band can be accurately indicated by using the third information.

In a possible design, the network device configures a second frequency band set for the terminal device, where the second frequency band set includes at least one of frequency bands corresponding to different data transmission types. In this way, the terminal device subsequently can accurately determine the first frequency band to transmit data.

In a possible design, the first frequency band may be a BWP.

According to a third aspect, this application further provides a data transmission apparatus. The data transmission apparatus includes:

a processor, configured to determine a first frequency band, where a bandwidth of the first frequency band is greater than a maximum channel bandwidth supported by the terminal device; and a transceiver, configured to receive first information from a network device, where the first information is used to indicate a first transmission frequency band, a bandwidth of the first transmission frequency band is smaller than or equal to the maximum channel bandwidth supported by the terminal device, and the first transmission frequency band is used by the terminal device to transmit data.

The processor is further configured to determine the first transmission frequency band based on the first information, where the first frequency band includes the first transmission frequency band.

The transceiver is further configured to transmit data to the network device in the first transmission frequency band.

In a possible design, the bandwidth of the first frequency band is smaller than or equal to a carrier bandwidth.

In a possible design, the transceiver is further configured to receive second information from the network device, where the second information is used to indicate the first frequency band; and when determining the first frequency band, the processor is specifically configured to determine the first frequency band based on the second information; or the first frequency band is predefined.

In a possible design, the transceiver is further configured to receive third information from the network device, where the third information is used to indicate a second frequency band; and the processor is further configured to determine the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band.

In a possible design, the third information may include at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In a possible design, the third information includes a first index, and the first index corresponds to the second frequency band in the first frequency band; and when determining the second frequency band based on the third information, the processor is specifically configured to determine the second frequency band based on the first index and a correspondence between the first index and the second frequency band.

In a possible design, the processor is further configured to determine the second frequency band based on at least one of the following: a time location at which the terminal device transmits data, a corresponding hybrid automatic repeat request HARQ process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band. The second frequency band is included in the first frequency band, a bandwidth of the second frequency band is smaller than or equal to the maximum channel bandwidth supported by the terminal device, and the first transmission frequency band is a part or all of the second frequency band.

In a possible design, the data is PDSCH data.

In a possible design, the processor is further configured to obtain a first frequency band set, where the first frequency band set includes at least one of frequency bands corresponding to different data transmission types; and when determining the first frequency band, the processor is specifically configured to determine the first frequency band based on a data transmission type and the first frequency band set.

According to a fourth aspect, this application further provides a data transmission apparatus. The data transmission apparatus includes:

a processing unit, configured to determine a first frequency band, where a bandwidth of the first frequency band is greater than a maximum channel bandwidth supported by a terminal device; and a transceiver unit, configured to receive first information from a network device, where the first information is used to indicate a first transmission frequency band, a bandwidth of the first transmission frequency band is smaller than or equal to the maximum channel bandwidth supported by the terminal device, and the first transmission frequency band is used by the terminal device to transmit data.

The processing unit is further configured to determine the first transmission frequency band based on the first information, where the first frequency band includes the first transmission frequency band.

The transceiver unit is further configured to transmit data to the network device in the first transmission frequency band.

In a possible design, the bandwidth of the first frequency band is smaller than or equal to a carrier bandwidth.

In a possible design, the transceiver unit is further configured to receive second information from the network device, where the second information is used to indicate the first frequency band; and when determining the first frequency band, the processing unit is specifically configured to determine the first frequency band based on the second information; or the first frequency band is predefined.

In a possible design, the transceiver unit is further configured to receive third information from the network device, where the third information is used to indicate a second frequency band; and the processing unit is further configured to determine the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band.

In a possible design, the third information may include at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In a possible design, the third information includes a first index, and the first index corresponds to the second frequency band in the first frequency band; and when determining the second frequency band based on the third information, the processing unit is specifically configured to determine the second frequency band based on the first index and a correspondence between the first index and the second frequency band.

In a possible design, the processing unit is further configured to determine the second frequency band based on at least one of the following: a time location at which the terminal device transmits data, a corresponding hybrid automatic repeat request HARQ process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band. The second frequency band is included in the first frequency band, a bandwidth of the second frequency band is smaller than or equal to the maximum channel bandwidth supported by the terminal device, and the first transmission frequency band is a part or all of the second frequency band.

In a possible design, the data is PDSCH data.

In a possible design, the processing unit is further configured to obtain a first frequency band set, where the first frequency band set includes at least one of frequency bands corresponding to different data transmission types; and when determining the first frequency band, the processing unit is specifically configured to determine the first frequency band based on a data transmission type and the first frequency band set.

According to a fifth aspect, this application further provides a data transmission apparatus. The data transmission apparatus includes:

a transceiver, configured to send first information to a terminal device, where the first information is used to indicate a first transmission frequency band, the first transmission frequency band is used by the terminal device to transmit data, the first transmission frequency band is included in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device; and receive data from the terminal device in the first transmission frequency band; and a processor, configured to control the transceiver to send and receive data.

In a possible design, the bandwidth of the first frequency band is smaller than or equal to a carrier bandwidth.

In a possible design, the transceiver is further configured to send second information to the terminal device, where the second information is used to indicate the first frequency band.

In a possible design, the transceiver is further configured to send third information to the terminal device, where the third information is used to indicate a second frequency band, the second frequency band is included in the first frequency band, a bandwidth of the second frequency band is smaller than or equal to the maximum channel bandwidth supported by the terminal device, and the first transmission frequency band is a part or all of the second frequency band.

In a possible design, the second information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In a possible design, the second information includes a first index, and the first index corresponds to the second frequency band in the first frequency band.

In a possible design, the processor is further configured to configure a second frequency band set for the terminal device, where the second frequency band set includes at least one of frequency bands corresponding to different data transmission types.

According to a sixth aspect, this application further provides a data transmission apparatus. The data transmission apparatus includes:

a transceiver unit, configured to send first information to a terminal device, where the first information is used to indicate a first transmission frequency band, the first transmission frequency band is used by the terminal device to transmit data, the first transmission frequency band is included in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device; and receive data from the terminal device in the first transmission frequency band; and a processing unit, configured to control the transceiver unit to send and receive data.

In a possible design, the bandwidth of the first frequency band is smaller than or equal to a carrier bandwidth.

In a possible design, the transceiver unit is further configured to send second information to the terminal device, where the second information is used to indicate the first frequency band.

In a possible design, the transceiver unit is further configured to send third information to the terminal device, where the third information is used to indicate a second frequency band, the second frequency band is included in the first frequency band, a bandwidth of the second frequency band is smaller than or equal to the maximum channel bandwidth supported by the terminal device, and the first transmission frequency band is a part or all of the second frequency band.

In a possible design, the second information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In a possible design, the second information includes a first index, and the first index corresponds to the second frequency band in the first frequency band.

In a possible design, the processing unit is further configured to configure a second frequency band set for the terminal device, where the second frequency band set includes at least one of frequency bands corresponding to different data transmission types.

According to a seventh aspect, this application further provides a communication system. The communication system includes the terminal device and the network device mentioned in at least one of the foregoing designs. Further, the network device in the communication system may perform any method performed by the network device in the foregoing methods, and the terminal device in the communication system may perform any method performed by the terminal device in the foregoing methods.

According to an eighth aspect, this application provides a computer-readable storage medium. The computer-readable storage medium stores computer-executable instructions. When invoked by a computer, the computer-executable instructions are used to enable the computer to perform any method in any one of the first aspect or the possible designs of the first aspect, or any one of the second aspect or the possible designs of the second aspect.

According to a ninth aspect, this application provides a computer program product including instructions. When the computer program product runs on a computer, the computer is enabled to perform any method in any one of the first aspect or the possible designs of the first aspect, or any one of the second aspect or the possible designs of the second aspect.

According to a tenth aspect, this application provides a chip. The chip is coupled to a memory and is configured to read and execute program instructions stored in the memory, to implement any method in any one of the first aspect or the possible designs of the first aspect, or any one of the second aspect or the possible designs of the second aspect.

DESCRIPTION OF EMBODIMENTS

The following further describes in detail this application with reference to the accompanying drawings.

The embodiments of this application provide a data transmission method and apparatus, to increase a frequency resource selection range of a terminal device with a low bandwidth capability, and improve data transmission efficiency of the terminal device with a low bandwidth capability. The method and the apparatus described in this application are based on a same inventive idea. Because problem resolving principles of the method and the apparatus are similar, mutual reference may be made to implementations of the apparatus and the method. Repeated parts are not described.

The following describes some terms in this application, to help a person skilled in the art have a better understanding.

(1) A carrier (carrier) bandwidth is also referred to as a system bandwidth, and may also be represented by a transmission bandwidth of a carrier. A network device may configure one or more carriers. Correspondingly, transmission bandwidths corresponding to the one or more carriers configured by the network device may be understood as system bandwidths. For example, if one network device configures one carrier, and a transmission bandwidth of the carrier is 100 MHz (megahertz), it may be considered that the system bandwidth is 100 MHz. For another example, if one network device configures five carriers, and a transmission bandwidth of each carrier is 20 MHz, it may also be considered that the system bandwidth is 100 MHz. For ease of describing the solution, in this application, an example in which the system bandwidth corresponds to the transmission bandwidth of one carrier is used for description.

Figure 1:
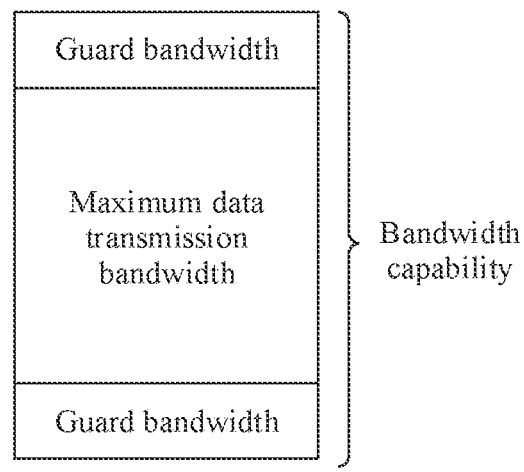
FIG. 1 is a schematic diagram of a bandwidth capability according to this application.

(2) Maximum channel bandwidth supported by a terminal device, namely, bandwidth capability of the terminal device. It may be understood that the maximum channel bandwidth supported by the terminal device is a maximum frequency resource that can be used simultaneously when the terminal device transmits data. The maximum frequency resource that can be used simultaneously may be maximum frequency resources that can be simultaneously used and that are continuous in frequency domain, and/or maximum frequency resources that can be used simultaneously by the terminal device on one carrier. For example, if a bandwidth capability of a terminal device is 5 MHz, it indicates that when data transmission (including receiving of downlink data and/or sending of uplink data) is performed between the terminal device and the network device, the terminal device may be scheduled in a frequency band corresponding to a transmission bandwidth other than a guard bandwidth on a frequency resource of 5 MHz at most, that is, scheduled in a frequency band corresponding to "the maximum data transmission bandwidth" shown in FIG. 1. It should be noted that, in this application, although the maximum frequency resource used by the terminal device with a bandwidth capability of 5 MHz when the terminal device performs data transmission is less than 5 MHz (excluding the guard bandwidth), for simplicity of description, it may also be understood that the maximum frequency resource that can be used is equal to the bandwidth capability.

(3) A terminal device with a low bandwidth capability may have the following three understandings in this application:

First understanding: The bandwidth capability of the terminal device is equal to a minimum bandwidth required for accessing an NR system.

In this application, the minimum bandwidth required for accessing the NR system may be understood as a necessary guard bandwidth and a transmission bandwidth corresponding to a downlink signal/information to be obtained by the terminal device for accessing the NR system. Alternatively, the minimum bandwidth required for accessing the NR system may be understood as a transmission bandwidth corresponding to a downlink signal/information to be obtained by the terminal device for accessing the NR system. It should be noted that, in the first manner of understanding "the terminal device with a low bandwidth capability", when the bandwidth capability of the terminal device is compared with the minimum bandwidth required for accessing the NR system, the two include the necessary guard bandwidth, or do not include the necessary guard bandwidth.

Currently, access to the NR system requires at least the following downlink signals/information:

a1. Synchronization signal block (synchronization signal block, SSB): The SSB includes a primary synchronization signal (primary synchronization signal, PSS), a secondary synchronization signal (secondary synchronization signal, SSS), and a physical broadcast channel (physical broadcast channel, PBCH). The SSB occupies four orthogonal frequency division multiplexing (orthogonal frequency division multiplexing, OFDM) symbols in time domain. The PSS and the SSS are respectively transmitted on the first and third OFDM symbols, and a corresponding transmission bandwidth is 12 resource blocks (resource blocks, RBs) (where more accurately, the transmission bandwidth of the PSS and the SSS corresponds to 127 subcarriers). Information included in the PBCH is transmitted on the second, third, and fourth OFDM symbols. On the second and fourth OFDM symbols, a transmission bandwidth is 20 RBs (corresponding to 240 subcarriers), and on the third OFDM symbol, a transmission bandwidth is 8 RBs (corresponding to 96 subcarriers). For example, the transmission bandwidth may be shown in FIG. 2.

Figure 2:
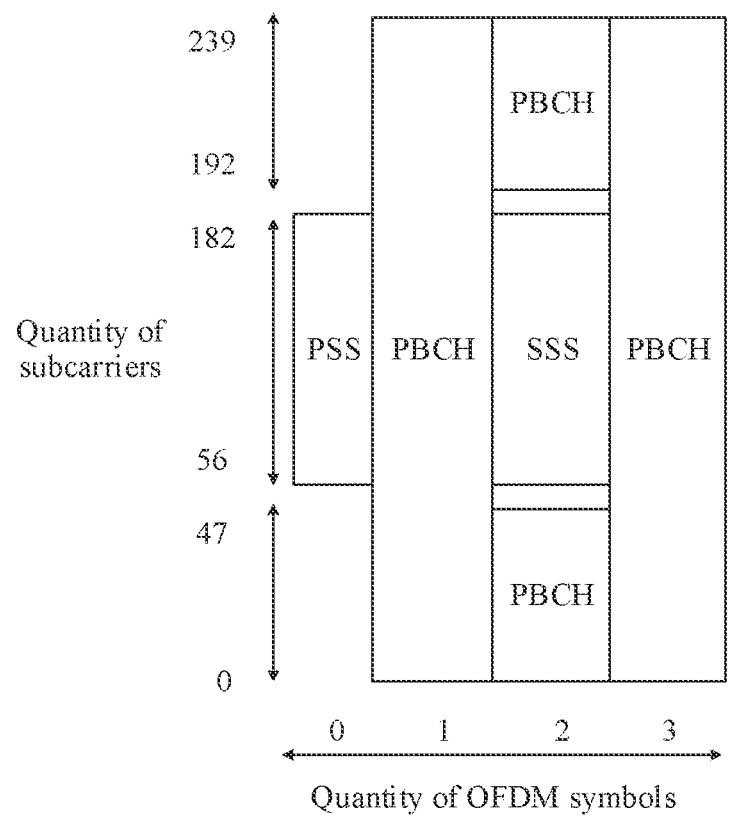
FIG. 2 is a schematic diagram of a synchronization signal block according to this application.

Based on FIG. 2, it may be understood that a transmission bandwidth corresponding to the SSB is 20 RBs. One RB includes 12 subcarriers. Therefore, due to different subcarrier spacings (subcarrier spacings, SCSs), transmission bandwidths corresponding to the SSB are different. For example, Table 1 shows an example of the transmission bandwidths corresponding to the SSB at several different subcarrier spacings.

TABLE 1

| | SCS/kHz | | | |
|---|---|---|---|---|
| | 15 | 30 | 120 | 240 |
| Transmission bandwidth of the SSB/MHz | 3.6 | 7.2 | 28.8 | 57.6 | a2. Necessary system information (system information, SI): In this application, the necessary SI may be understood as minimum system information to be obtained by the terminal device before the terminal device initiates random access to the network device. For example, in an NR system, the terminal device may determine, by using control information in a PBCH, control information for scheduling a system information block type 1 (system information block type 1, SIB 1), and then determine the SIB 1 based on the control information for scheduling the SIB 1 (referred to as SIB1 control information for short below). The SIB 1 includes necessary information, for example, a random access preamble (preamble), required for the terminal device to initiate random access to the network device. For ease of description, in this application, necessary system information may be represented by the SIB 1.

According to the foregoing description, because the terminal device may separately receive the SSB and the SIB 1 at different moments, a maximum value of a transmission bandwidth corresponding to the SSB and a transmission bandwidth corresponding to the SIB 1 may be used as the minimum bandwidth required for accessing the NR system. Further, if the terminal device obtains the SIB 1, the terminal device needs to first read the SIB1 control information, and then determine the SIB 1 based on the SIB1 control information. In this case, the transmission bandwidth corresponding to the SIB 1 may be represented by a transmission bandwidth corresponding to the SIB1 control information or the transmission bandwidth corresponding to the SIB 1. For example, the SIB1 control information is carried on a physical downlink control channel (physical downlink control channel, PDCCH), and the SIB 1 is carried on a physical downlink shared channel (physical downlink shared channel, PDSCH). The transmission bandwidth corresponding to the SIB 1 may be represented by a transmission bandwidth corresponding to the PDCCH carrying the SIB1 control information or a transmission bandwidth corresponding to the PDSCH carrying the SIB 1. Further, optionally, if there are a plurality of transmission bandwidths corresponding to the SIB 1, a maximum value of a minimum transmission bandwidth corresponding to the SIB 1 and the transmission bandwidth corresponding to the SSB may be used as the minimum bandwidth required for accessing the NR system. For example, when a subcarrier spacing corresponding to the SSB and a subcarrier spacing corresponding to the PDCCH including the SIB1 control information are both 15 kHz, the transmission bandwidth corresponding to the SIB1 control information may be 24 RBs, 48 RBs, or 96 RBs. Herein, to determine the minimum bandwidth required for accessing the NR system, 24 RBs (4.32 MHz) may be used as the minimum transmission bandwidth corresponding to the SIB 1. Considering that the transmission bandwidth corresponding to the SSB is 20 RBs (3.6 MHz), the minimum bandwidth required for accessing the NR system may be understood as 4.32 MHz. For another example, when a subcarrier spacing corresponding to the SSB is 30 kHz and a subcarrier spacing corresponding to the PDCCH including the SIB1 control information is 15 kHz, the transmission bandwidth corresponding to the SIB1 control information may be 48 RBs or 96 RBs. Similarly, to determine the minimum bandwidth required for accessing the NR system, 48 RBs (8.64 MHz) may be used as the minimum transmission bandwidth corresponding to the SIB 1. Considering that the transmission bandwidth corresponding to the SSB is 20 RBs (7.2 MHz), the minimum bandwidth required for accessing the NR system may be understood as 8.64 MHz. In addition, if influence of the guard bandwidth is considered, in the foregoing two examples, the minimum bandwidths required for accessing the NR system may be 5 MHz and 10 MHz respectively. Correspondingly, terminal devices with bandwidth capabilities of 5 MHz and 10 MHz may be considered as terminal devices with a low bandwidth capability in the foregoing two examples.

It should be noted that the SIB1 control information may alternatively be carried on another physical layer channel, for example, an enhanced physical downlink control channel (enhanced physical downlink control channel, EPDCCH). The SIB 1 may alternatively be carried on another physical layer channel. This is not specifically limited in this application.

Second understanding: Whether a terminal device is a terminal device with a low bandwidth capability is determined based on a relationship between a sum of transmission bandwidths of bandwidth parts (bandwidth parts, BWPs) configured for the terminal device and the system bandwidth.

Specifically, for a terminal device, on one carrier, it is assumed that the network device configures a maximum quantity of BWPs for the terminal device at a time, and a transmission bandwidth corresponding to each configured BWP is equal to a bandwidth capability of the terminal device. In this case, if a sum of transmission bandwidths corresponding to all configured BWPs is still less than the system bandwidth, such a terminal device in this application may also be understood as a terminal device with a low bandwidth capability. Optionally, in this case, a frequency resource corresponding to each BWP in all the configured BWPs does not overlap a frequency resource corresponding to another BWP in all the configured BWPs. Assuming that a system bandwidth corresponding to one carrier is 50 MHz, a bandwidth capability of a terminal device is 5 MHz or 10 MHz, and the network device may configure four BWPs for the terminal device at a time on the carrier, a total transmission bandwidth corresponding to the BWPs configured for the terminal device at a time on the carrier is 20 MHz. Because 20 MHz is less than 50 MHz, the terminal device may also be considered as a terminal device with a low bandwidth capability.

Third understanding: Whether a terminal device is a terminal device with a low bandwidth capability is determined based on a relationship between a frequency range of dynamic transmission performed by the terminal device and the system bandwidth.

Specifically, for a terminal device, on a carrier, if a frequency resource range that can be used for dynamic transmission when the terminal device performs data transmission with the network device is less than a specific threshold, the terminal device may be considered as a terminal device with a low bandwidth capability in this application. The specific threshold may be equal to a system bandwidth corresponding to the carrier, or is equal to X times the system bandwidth corresponding to the carrier. X is a decimal or a fraction greater than 0 and smaller than or equal to 1. It should be noted that the dynamic transmission herein may include the following understandings:

b1. Data transmission implemented by using physical layer signaling may be considered as dynamic transmission. The physical layer signaling herein includes signaling transmitted through a physical layer downlink control channel such as a PDCCH and an EPDCCH. The data transmission includes uplink data transmission and/or downlink data transmission, and data may include information and/or a signal, and the like. It should be noted that the downlink control channel in the embodiments of this application may alternatively be an NR-PDCCH, or another channel that is newly defined in a future communication protocol and that similarly functions as the downlink control channel. A type and a name of the downlink control channel are not limited in the embodiments of this application, and all downlink control channels are collectively referred to as PDCCHs. The PDCCH carries downlink control information (downlink control information, DCI), and the DCI may include resource allocation information and/or other control information of one or more terminal devices.

b2. If a frequency resource corresponding to data (including data received from the network device and/or data sent to the network device) transmitted by the terminal device falls within a preconfigured frequency resource range, the data transmission may be understood as the dynamic transmission. For example, the network device may preconfigure, by using radio resource control (radio resource control, RRC) signaling, a frequency resource range (for example, a frequency range corresponding to a BWP configured by using RRC signaling in NR) for data transmission, all data transmission performed within the frequency resource range may be considered as the dynamic transmission. On the other hand, if data transmission between the terminal device and the network device needs to be performed outside the preconfigured frequency resource range, the network device first needs to reconfigure a frequency resource range (for example, reconfigure a BWP) for data transmission for the terminal device by using RRC signaling, and then after the terminal device correctly receives the reconfiguration information, data transmission between the terminal device and the network device can only be performed within the reconfigured frequency resource range. Because RRC reconfiguration is required in this process, a long delay is required. Therefore, data transmission whose corresponding frequency resource is outside the preconfigured frequency resource range for data transmission is not considered as the dynamic transmission.

It should be noted that a terminal device with a low bandwidth capability may alternatively be defined in another manner, which is not specifically limited. For example, if a bandwidth capability of a terminal device is less than a threshold (for example, Y MHz, where Y is a number greater than zero), the terminal device may be considered as a terminal device with a low bandwidth capability.

It should be noted that, in this application, for ease of description, the transmission bandwidth or the data transmission bandwidth may include a guard bandwidth, although the guard bandwidth is not used for data transmission. For example, when a bandwidth capability of a terminal device is described, if a transmission bandwidth of the terminal device is 5 MHz (or the bandwidth capability of the terminal device is 5 MHz), 5 MHz may include the guard bandwidth. However, when the network device performs data transmission with the terminal device, an actual maximum available data transmission bandwidth is less than 5 MHz.

It should be noted that, in this application, for a terminal device that supports carrier aggregation (carrier aggregation, CA), provided that the terminal device has the foregoing feature on one of carriers, the terminal device may be understood as a terminal device with a low bandwidth capability.

(4) In descriptions of the embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects.

(5) "At least one (piece)" in this application refers to "one or more (pieces)". "A plurality of (pieces)" means "two or more (pieces)".

(6) In descriptions of this application, words such as "first" and "second" are merely intended for purposes of description, and should not be understood as indicating or implying relative importance or a sequence.

To describe the technical solutions in the embodiments of this application more clearly, the following describes in detail the data transmission method and apparatus provided in the embodiments of this application with reference to the accompanying drawings.

Figure 3:
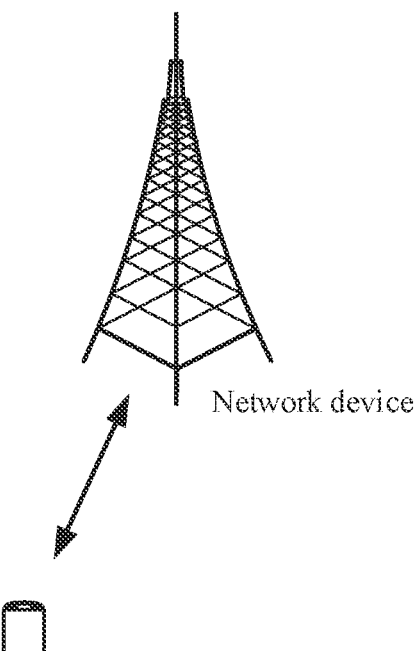
FIG. 3 is a diagram of an architecture of a communication system according to this application.

FIG. 3 shows a possible architecture of a communication system to which the data transmission method provided in the embodiments of this application is applicable. The architecture of the communications system includes a network device and a terminal device.

The network device is a device having a radio transceiver function, a node in a radio access network (radio access network, RAN), or a chip that may be disposed in the network device. The network device includes but is not limited to: a next generation NodeB (next generation NodeB, gNB), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, a home NodeB, HNB, or a femto), a picocell (pico), a baseband unit (baseband unit, BBU), an access point (access point, AP) in a wireless fidelity (wireless fidelity, Wi-Fi) system, a wireless relay node (relay), a wireless backhaul node, or a transmission point (a transmission reception point, TRP, or a transmission point, TP), or may be a network node that constitutes a gNB or a transmission point, for example, a baseband unit (BBU) or a distributed unit (distributed unit, DU).

In some deployments, the gNB may include a centralized unit (centralized unit, CU) and a DU. The gNB may further include a radio unit (radio unit, RU). The CU implements a part of functions of the gNB, and the DU implements a part of functions of the gNB. For example, the CU implements functions of a radio resource control (radio resource control, RRC) layer and a packet data convergence protocol (packet data convergence protocol, PDCP) layer, while the DU implements functions of a radio link control (radio link control, RLC) layer, a media access control (media access control, MAC) layer, and a physical (physical, PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It can be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in the embodiments of this application may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a radio relay node, or the like. Application scenarios are not limited in the embodiments of this application. The terminal device having a wireless transceiver function and a chip that may be disposed in the terminal device are collectively referred to as terminal devices in this application.

Data is transmitted between the network device and the terminal device through an air interface (air interface).

The terminal device in the solutions of this application may be understood as a terminal device with a low bandwidth capability.

It should be noted that the communication system shown in FIG. 3 may be a wireless communication system, and may be but is not limited to a 4.5G or 5G wireless communication system, a further evolved system based on long term evolution (long term evolution, LTE) or NR, and various future communication systems, for example, a 6G system or another communication network.

Figure 4:
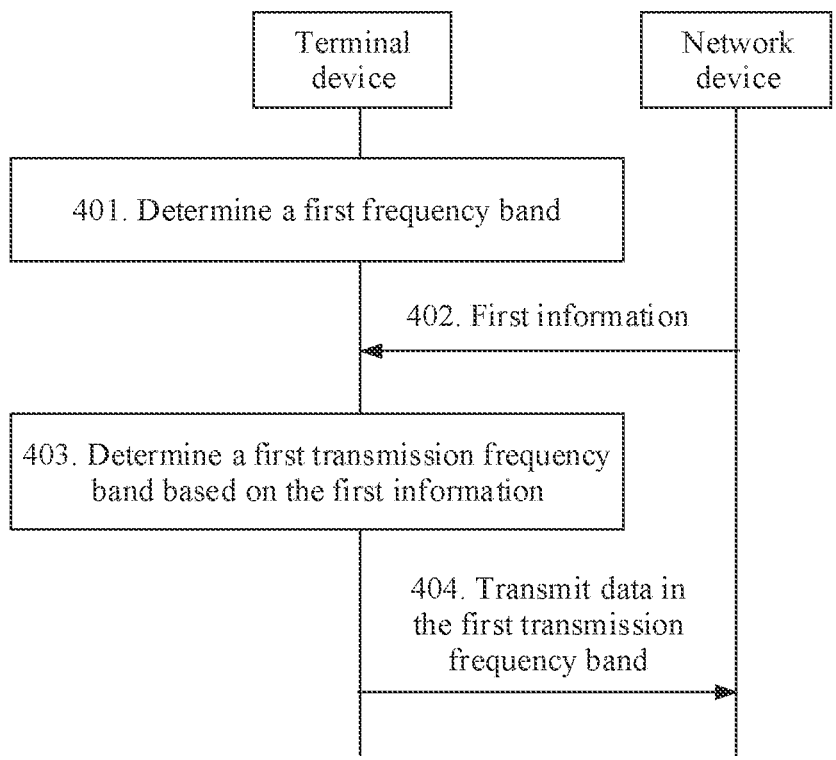
FIG. 4 is a schematic flowchart of a data transmission method according to this application.

An embodiment of this application provides a data transmission method, applicable to the communication system shown in FIG. 3. Referring to FIG. 4, a specific procedure of the method includes the following steps.

Step 401: A terminal device determines a first frequency band, where a bandwidth of the first frequency band is greater than a maximum channel bandwidth supported by the terminal device.

Specifically, the first frequency band is used to transmit data. For example, the terminal device and a network device may transmit uplink data and/or downlink data. In other words, the first frequency band may be further used to transmit other data, for example, PDCCH data. This is not limited in this application.

For example, the first frequency band may include continuous frequency resources in frequency domain on one carrier, for example, include continuous subcarriers, resource elements (resource elements, REs), and RBs.

In an actual application, the bandwidth of the first frequency band is smaller than or equal to a carrier bandwidth. It may be understood that the carrier bandwidth herein may be understood as a carrier bandwidth configured by the network device for the terminal device, and the configured carrier bandwidth may be equal to or less than a system bandwidth on the network device side. For example, the system bandwidth on the network device side is 100 MHz, and the carrier bandwidth configured for the terminal device may be 20 MHz, 40 MHz, or another value less than or equal to 100 MHz.

Step 402: The terminal device receives first information from the network device, where the first information is used to indicate a first transmission frequency band, the first transmission frequency band is used by the terminal device to transmit data, and a bandwidth of the first transmission frequency band is smaller than or equal to the maximum channel bandwidth supported by the terminal device.

Step 403: The terminal device determines the first transmission frequency band based on the first information, where the first frequency band includes the first transmission frequency band.

Step 404: The terminal device transmits data to the network device in the first transmission frequency band.

In an optional implementation, there may be at least the following two manners for the terminal device to determine the first frequency band in step 401:

Manner c1: The terminal device receives second information from the network device, where the second information is used to indicate the first frequency band; and the terminal device determines the first frequency band based on the second information.

Specifically, the second information may be first frequency band information. The first frequency band information may include information corresponding to the first frequency band, for example, the bandwidth of the first frequency band, a frequency domain location of the first frequency band on a carrier on which the first frequency band is located, an SCS configuration and a cyclic prefix (cyclic prefix, CP) configuration used when the terminal device transmits data in the first frequency band, configuration information used when data of a control channel (for example, the control channel may include but is not limited to a PDCCH, an EPDCCH, and a physical uplink control channel (physical uplink control channel, PUCCH)) is transmitted by using the first frequency band, and configuration information used when data of a shared channel (for example, the shared channel may include but is not limited to a PDSCH, and a physical uplink shared channel (physical uplink shared channel, PUSCH)) is transmitted by using the first frequency band.

Manner c2: The first frequency band is predefined.

Specifically, in Manner c1, the second information may be RRC signaling, medium access control (media access control, MAC) signaling, physical layer signaling, or the like that is sent by the network device, or may be other signaling sent by the network device, for example, a combination of the foregoing signaling. Certainly, the second information may alternatively be sent by using the foregoing signaling, that is, the second information is included in the foregoing signaling. This is not limited in this application. It should be noted that the signaling may also be understood as a message, information, or the like.

In a specific implementation, the network device may configure one or more first frequency bands for the terminal device. Each first frequency band may be independently configured, or the first frequency bands may be jointly configured. In other words, some or all of first frequency band information corresponding to the plurality of first frequency bands is the same. In addition, when the network device configures a plurality of first frequency bands for the terminal device, frequency domain resources corresponding to different first frequency bands may overlap, or may not overlap. This is not specifically limited in this application. The terminal device may select the first frequency band from the one or more configured first frequency bands.

In an implementation, in an NR system, the first frequency band may be a bandwidth part (bandwidth part, BWP). For example, the network device may configure a plurality of BWPs for the terminal device by using RRC signaling, and then indicate an activated BWP in the plurality of BWPs by using physical layer signaling. Then, data transmission between the network device and the terminal device is performed in the activated BWP. For another example, the network device may configure an activated BWP for the terminal device only by using RRC signaling, and then data transmission between the terminal device and the network device is performed in the activated BWP. It should be noted that, in this application, an activated BWP and a configured but not activated BWP may differ in at least one of the following three points:

d1. In the configured but not activated BWP, the terminal device does not expect to receive downlink channel data and/or a downlink signal, for example, PDSCH data, PDCCH data, or a channel state information reference signal (channel state information reference signal, CSI-RS). If the CSI-RS is used for radio resource management (radio resource management, RRM), the terminal device may perform RRM measurement on the configured but not activated BWP by using the CSI-RS.

d2. In the configured but not activated BWP, the terminal device does not expect to send uplink channel data and/or an uplink signal, for example, PUSCH data, PUCCH data, and a sounding reference signal (Sounding Reference Signal, SRS).

d3. In the activated BWP, the terminal device performs data transmission with the network device on a frequency resource included in the activated BWP. In the activated BWP except the foregoing frequency resource for data transmission, in another frequency resource range, behavior of the terminal device may be the same as behavior of the terminal device in the configured but not activated BWP, that is, d1 and d2 are satisfied.

In an example implementation, different data transmission types require different frequency bands for data transmission. The network device may configure different BWPs (that is, configure different frequency bands) for different data transmission types in one carrier bandwidth for a same terminal device. The different data transmission types may include service data, control data, and a reference signal used for measurement. The service data may include data carried on a PUSCH and a PDSCH. The reference signal used for measurement may include a CSI-RS. Through this design, a frequency band (BWP) may be specially designed for different data transmission types, to ensure transmission efficiency of transmission of various data. For example, for a same terminal device, a BWP configured for transmission of service data (for example, data carried on a PUSCH or a PDSCH) may be different from a BWP configured for transmission of control data (for example, data carried on a PDCCH or a PUCCH). More specifically, a bandwidth corresponding to a BWP configured for transmission of service data may be greater than a bandwidth corresponding to a BWP configured for transmission of control data. In this implementation, when receiving control data carried on a control channel, the terminal device can obtain benefits of energy saving (that is, power consumption reduction), and when receiving service data carried on a data channel, the terminal device can obtain a frequency selective scheduling gain. For another example, for a same terminal device, a BWP configured for transmission of service data and a BWP configured for transmission of a measurement reference signal may be different. More specifically, a bandwidth corresponding to a BWP configured for transmission of service data may be greater than a bandwidth corresponding to a BWP configured for transmission of a measurement reference signal. In this implementation, a frequency selective scheduling gain can be ensured for transmission of service data, and it can be ensured that a finer channel state is measured by the measurement signal for transmission of a measurement reference signal, thereby improving data transmission efficiency. It may be understood that, in this application, the data carried on the PUSCH and the data carried on the PDSCH may be considered as different types of data, and the data carried on the PDCCH and the data carried on the PUCCH may be considered as different types of data. It should be noted that the bandwidth of the BWP may be greater than the maximum channel bandwidth supported by the terminal device, or may not be greater than the maximum channel bandwidth supported by the terminal device. When the bandwidth of the BWP is greater than the maximum channel bandwidth supported by the terminal device, the BWP may also be referred to as a virtual BWP.

It may be understood that, in this application, the data carried on the PUSCH and the PDSCH may be understood as data transmitted through the PUSCH and the PDSCH, and the data carried on the PDCCH and the PUCCH may be understood as data transmitted through the PDCCH and the PUCCH.

Based on this, when determining that data to be transmitted is PDSCH data, the terminal device may determine the first frequency band.

Specifically, the terminal device may obtain a first frequency band set, where the first frequency band set includes at least one of frequency bands corresponding to different data transmission types; and a specific method used by the terminal device to determine the first frequency band may be: The terminal device determines the first frequency band based on a data transmission type and the first frequency band set.

The first frequency band set may include a second frequency band set, or the first frequency band set may include a second frequency band set and a third frequency band set. The second frequency band set is configured by the network device for the terminal device, and the second frequency band set includes at least one of frequency bands corresponding to different data transmission types. The third frequency band set is predefined, and the third frequency band set includes at least one of frequency bands corresponding to different data transmission types.

It should be noted that when the terminal device obtains the first frequency band set, a manner is as follows: The terminal device obtains a correspondence between a data transmission type and a frequency band, and subsequently may determine the first frequency band based on a required data transmission type and the foregoing correspondence. Another manner is that, the terminal device obtains frequency band information, and may subsequently determine the first frequency band based on a predefined or specific indication.

It should be noted that a frequency band included in the first frequency band set may be a frequency band greater than the maximum channel bandwidth supported by the terminal device, or a frequency band smaller than or equal to the maximum channel bandwidth supported by the terminal device and a frequency band greater than the maximum channel bandwidth supported by the terminal device. For example, the PDSCH data may be transmitted by using a frequency band greater than the maximum channel bandwidth supported by the terminal device, and a PDCCH or a reference signal may be transmitted by using a frequency band smaller than or equal to the maximum channel bandwidth supported by the terminal device. The reference signal may be, for example, a CSI-RS. In this way, different data is transmitted by using frequency bands of different bandwidths, so that data transmission efficiency can be improved.

In a specific implementation, in step 402, the first information may be scheduling information sent by the network device to the terminal device. In addition to indicating the first transmission frequency band, the first information may further include other control information required for data transmission, for example, a time resource corresponding to data transmission (that is, time at which data transmission occurs), a modulation and coding scheme (modulation and coding scheme, MCS) corresponding to data transmission, and power configuration information and a transport block size (transport block size, TBS) corresponding to data transmission, and may further include other control information related to data transmission. This is not specifically limited in this application. It should be noted that the data in the data transmission herein may include service data, control data, and a signal, and may further include other types of information and the like transmitted between the terminal device and the network device.

Specifically, the terminal device may receive scheduling information by using at least one of RRC signaling, MAC signaling, or physical layer signaling. In other words, the scheduling information may be carried in at least one of RRC signaling, MAC signaling, or physical layer signaling. For example, for a grant free (grant free) data scheduling manner, the terminal device generally receives control information (where the control information may be considered as the scheduling information) by using a physical layer downlink control channel, determines, based on the control information, a time-frequency resource, a TBS, or the like corresponding to data transmission between the terminal device and the network device, and transmits data on the corresponding time-frequency resource. For another example, for a non-grant free data scheduling manner, especially for sending of uplink data, the network device generally first configures, by using RRC signaling, data transmission-related control information (where the control information may be considered as the scheduling information) such as a frequency resource or a TBS for the terminal device. When uplink data needs to be sent, the terminal device sends the data on a corresponding frequency domain resource based on the data transmission-related control information preconfigured by using the RRC signaling.

Figure 5:
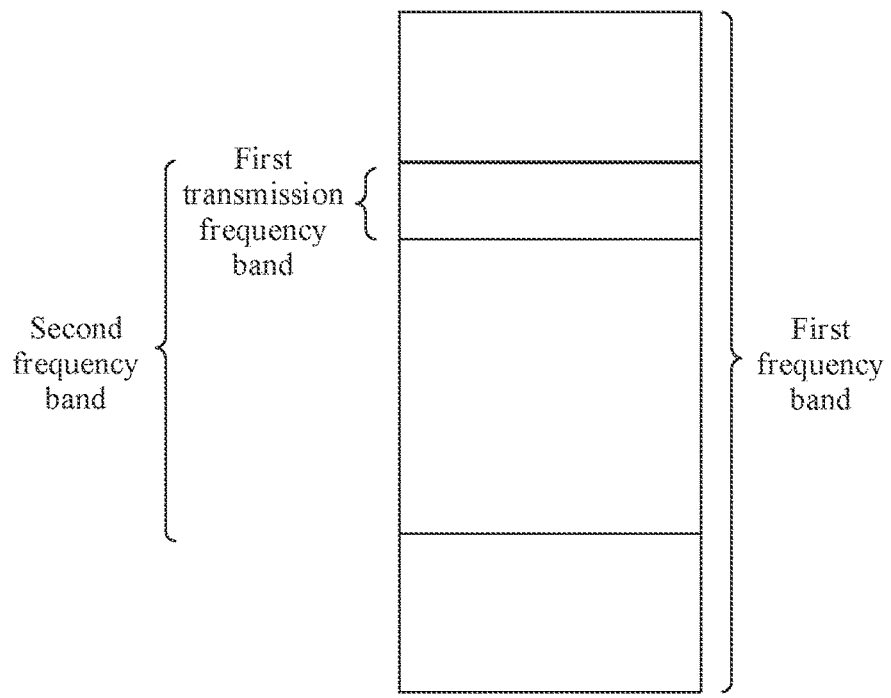
FIG. 5 is a schematic diagram of a relationship between a first frequency band, a second frequency band, and a first transmission frequency band according to this application.

In an optional implementation, the terminal device further receives third information from the network device, where the third information is used to indicate a second frequency band; and the terminal device determines the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band. For example, FIG. 5 shows a relationship between the first frequency band, the second frequency band, and the first transmission frequency band.

In this case, the terminal device and the network device transmit data to each other in the first transmission frequency band in the second frequency band.

For example, the second frequency band may include continuous frequency resources in frequency domain on one carrier, for example, include continuous subcarriers, REs, and RBs.

Specifically, the third information may be RRC signaling, MAC signaling, physical layer signaling, or the like that is sent by the network device, or may be other signaling sent by the network device, for example, a combination of the foregoing signaling. Certainly, the third information may alternatively be sent by using the foregoing signaling, that is, the third information is included in the foregoing signaling. This is not limited in this application.

In an example, the third information may include at least a frequency domain resource location corresponding to the second frequency band; and the frequency domain resource location corresponding to the second frequency band may be a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

Figure 6:
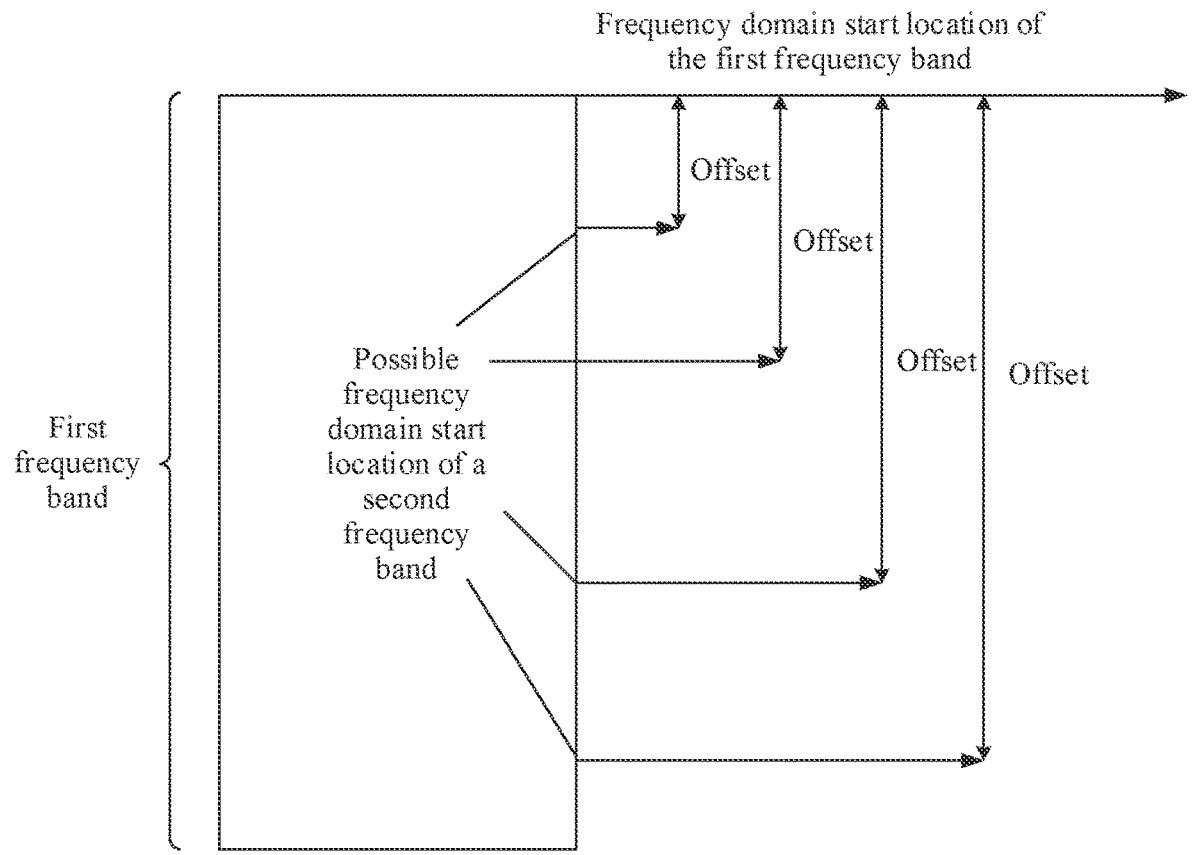
FIG. 6 is a schematic diagram of an offset between a frequency domain start location of a first frequency band and that of a second frequency band according to this application.

Specifically, the offset of the second frequency band relative to the frequency domain start location of the first frequency band in the first frequency band may be an offset between the frequency domain start location of the first frequency band and the frequency domain start location of the second frequency band. For example, the offset between the frequency domain start location of the first frequency band and that of the second frequency band may be shown in FIG. 6. In this implementation, the network device may directly indicate the offset by using downlink control information (downlink control information, DCI) included in a physical layer control channel.

Similarly, the frequency domain resource location corresponding to the second frequency band is the offset of the second frequency band relative to the frequency domain end location of the first frequency band in the first frequency band, and may be an offset between the frequency domain end location of the first frequency band and the frequency domain end location of the second frequency band. Other descriptions are similar to the description of the offset of the second frequency band relative to the frequency domain start location of the first frequency band in the first frequency band, and reference may be made to each other. Details are not described herein again.

In another example, the third information may include a first index, and the first index corresponds to the second frequency band in the first frequency band; and a specific method used by the terminal device to determine the second frequency band based on the third information may be: The terminal device determines the second frequency band based on the first index and a correspondence between the first index and the second frequency band.

Specifically, the network device may preconfigure a specific location of the second frequency band in frequency domain by using higher layer signaling such as RRC signaling, and then indicate, with reference to physical layer signaling, an effective second frequency band. Herein, the effective second frequency band may be understood similarly as the foregoing activated BWP. That is, data transmission between the network device and the terminal device can be performed only in the effective second frequency band. Specially, data transmission for RRM measurement, for example, transmission of a reference signal, may alternatively be performed in an ineffective second frequency band. For example, when configuring the first frequency band, the network device may configure, at a time, second frequency bands included in the first frequency band, and then indicate a specific effective second frequency band with reference to the physical layer signaling. For example, the first frequency band configured by the network device includes four second frequency bands, and each second frequency band corresponds to a unique index (that is, the first index herein). The network device may indicate, by using two bits, a specific effective second frequency band. For example, 00 corresponds to a $1^{st}$ second frequency band, 01 corresponds to a $2^{nd}$ second frequency band, 10 corresponds to a $3^{rd}$ second frequency band, and 11 corresponds to a $4^{th}$ second frequency band. In this case, there is a correspondence between the first index and the second frequency band.

In another optional implementation, the terminal device may determine the second frequency band based on at least one of the following parameters: a time location at which the terminal device transmits data, a corresponding hybrid automatic repeat request (hybrid automatic repeat request, HARQ) process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band. The second frequency band is included in the first frequency band, a bandwidth of the second frequency band is smaller than or equal to the maximum channel bandwidth supported by the terminal device, and the first transmission frequency band is a part or all of the second frequency band.

Specifically, the foregoing information (parameters) is described in detail:

(1) Time location at which the terminal device transmits data: The time location at which the terminal device transmits data may be represented by a slot (slot) index, an OFDM symbol index, an odd slot index, an even time sequence index, or the like, or may be other time-related information. This is not specifically limited in this application. The slot index may be an absolute index, or may be a relative index within a time range. For example, the slot index may be an absolute index within 10 ms. For example, duration of one slot is 0.5 ms, and 20 slots in total are included in 10 ms. In this case, 20 corresponding slot indexes range from, for example, slot 0 to slot 19. In another 10 ms, slot indexes corresponding to 20 slots also range from slot 0 to slot 19. Optionally, it is assumed that four second frequency bands are included in the first frequency band, and slot indexes are represented by relative indexes. Data transmission performed between the network device and the terminal device in slot 0 to slot 4, slot 5 to slot 9, slot 10 to slot 14, and slot 15 to slot 19 may respectively correspond to a $1^{st}$ second frequency band, a $2^{nd}$ second frequency band, a $3^{rd}$ second frequency band, and a $4^{th}$ second frequency band. Alternatively, data transmission performed between the network device and the terminal device in slot (4*m+n−1) may correspond to an $n^{th}$ second frequency band. In this example, a value of n is 1, 2, 3, or 4, and a value of m is 0, 1, 2, 3, or 4. The correspondence between the second frequency band and the time location information of the second frequency band may alternatively have another form of expression. This is not specifically limited in this application.

(2) The corresponding quantity of transmissions when the terminal device transmits data is a quantity of transmissions corresponding to data transmitted between the network device and the terminal device for a same HARQ process. Specifically, for the same HARQ process, there may be the following three cases for the quantity of transmissions corresponding to transmitted data:

Case e1: The network device and the terminal device record the quantity of transmissions corresponding to transmitted data since the first time the HARQ is used to transmit data, until a recounting condition is met. For example, within preconfigured time, there is a one-to-one correspondence between different quantities of transmissions corresponding to data transmitted by using the HARQ, and the second frequency bands included in the first frequency band. For example, assuming that the first frequency band includes four second frequency bands, the first transmission performed by using the HARQ may correspond to a 1 second frequency band, the second transmission performed by using the HARQ may correspond to a $2^{nd}$ second frequency band, and so on. The fifth transmission performed by using the HARQ may correspond to the $1^{st}$ second frequency band again. It should be noted that, in this application, if the first frequency band includes a plurality of second frequency bands, ranks of the different second frequency bands may correspond to different indexes. For example, a $1^{st}$ second frequency band may be understood as a second frequency band whose index number is 1 or 0 in the first frequency band. Alternatively, ranks of the second frequency bands may be determined based on start frequency locations corresponding to the different second frequency bands. Alternatively, there may be another ranking manner. This is not specifically limited. Optionally, second frequency bands corresponding to the first data transmissions performed by using different HARQ processes may be the same, or may be different.

Case e2. The network device and the terminal device record, for same data transmission, a quantity of transmissions corresponding to transmitted data. Generally, for the same data transmission, if the first data transmission performed between the network device and the terminal device fails, the network device and the terminal device further need to retransmit the data subsequently, to ensure, as much as possible, that the data is correctly received. After the data is correctly received by the receive side (the network device or the terminal device), a HARQ process (that is, a HARQ process corresponding to the correctly received data) may be reused, to transmit new data. For example, for same data transmission, three transmissions are performed between the network device and the terminal device to ensure correct reception. In this case, the three transmissions may respectively correspond to different second frequency bands included in the first frequency band. For example, the first transmission corresponds to a $1^{st}$ second frequency band, the second transmission corresponds to a $2^{nd}$ second frequency band, and the third transmission corresponds to a $3^{rd}$ second frequency band.

Case e3: For a same HARQ process, different redundancy versions (redundancy versions, RVs) corresponding to data transmission may also be understood as different quantities of transmissions corresponding to transmitted data. For example, for same data transmission, redundancy versions 0, 1, 2, and 3 may be used. Different redundancy versions may correspond to different second frequency bands included in the first frequency band, or newly transmitted data and retransmitted data correspond to different second frequency bands. Generally, the redundancy versions 1, 2, and 3 may all correspond to the retransmitted data. Therefore, the redundancy versions 1, 2, and 3 may correspond to a same second frequency band included in the first frequency band, but the second frequency band may be different from a second frequency band corresponding to the redundancy version 0 (generally applied to the newly transmitted data).

(3) Corresponding HARQ process when the terminal device transmits data: There is a correspondence between a HARQ process corresponding to data transmission and a second frequency band corresponding to the data transmission. Optionally, when the network device configures the first frequency band, if a quantity of HARQ processes that can be used by the first frequency band and/or HARQ process index numbers are configured, second frequency bands included in the first frequency band may have a correspondence with only the HARQ processes configured for the first frequency band.

It should be noted that, at least one parameter described above may be understood as having a correspondence with a specific location of the second frequency band. The correspondence may be configured in a protocol specification, a preconfiguration, or RRC signaling, or may be notified of by using another signaling form, for example, MAC signaling or physical layer signaling. This is not specifically limited in this application.

In still another optional implementation, the second frequency band may be predefined (or specified in a protocol). For example, it may be predefined that the bandwidth of the second frequency band is the same as the maximum channel bandwidth supported by the terminal device. In this case, if the maximum channel bandwidth supported by the terminal device is Y MHz, it may be considered that the bandwidth of the second frequency band is also Y MHz. Y is a number greater than zero.

According to the foregoing method, in one aspect, because the second frequency band is included in the first frequency band and the bandwidth of the first frequency band is greater than the maximum channel bandwidth supported by the terminal device, the terminal device may be scheduled within a larger frequency resource range (the second frequency band including scheduled resources is included in the first frequency band, and the second frequency band may change dynamically within the first frequency band). Therefore, for data transmission, more frequency selective scheduling gains can be obtained. In another aspect, because the second frequency band is smaller than or equal to the maximum channel bandwidth supported by the terminal device, and the scheduled resources are included in the second frequency band, normal data transmission between the terminal device and the network device is ensured. This is because generally, when performing data transmission with the network device, the terminal device first adjusts a radio frequency (radio frequency, RF) filter, to ensure that data can be received and/or sent within a corresponding frequency resource range. In addition, a size of the RF filter is generally related to the maximum channel bandwidth supported by the terminal device. Because the second frequency band is smaller than or equal to the maximum channel bandwidth supported by the terminal device, it can be ensured that the terminal device can receive, by using the RF filter, data scheduled in the second frequency band.

For example, based on the foregoing description, downlink data transmission is used as an example to describe a data transmission process between the network device and the terminal device.

Figure 7:
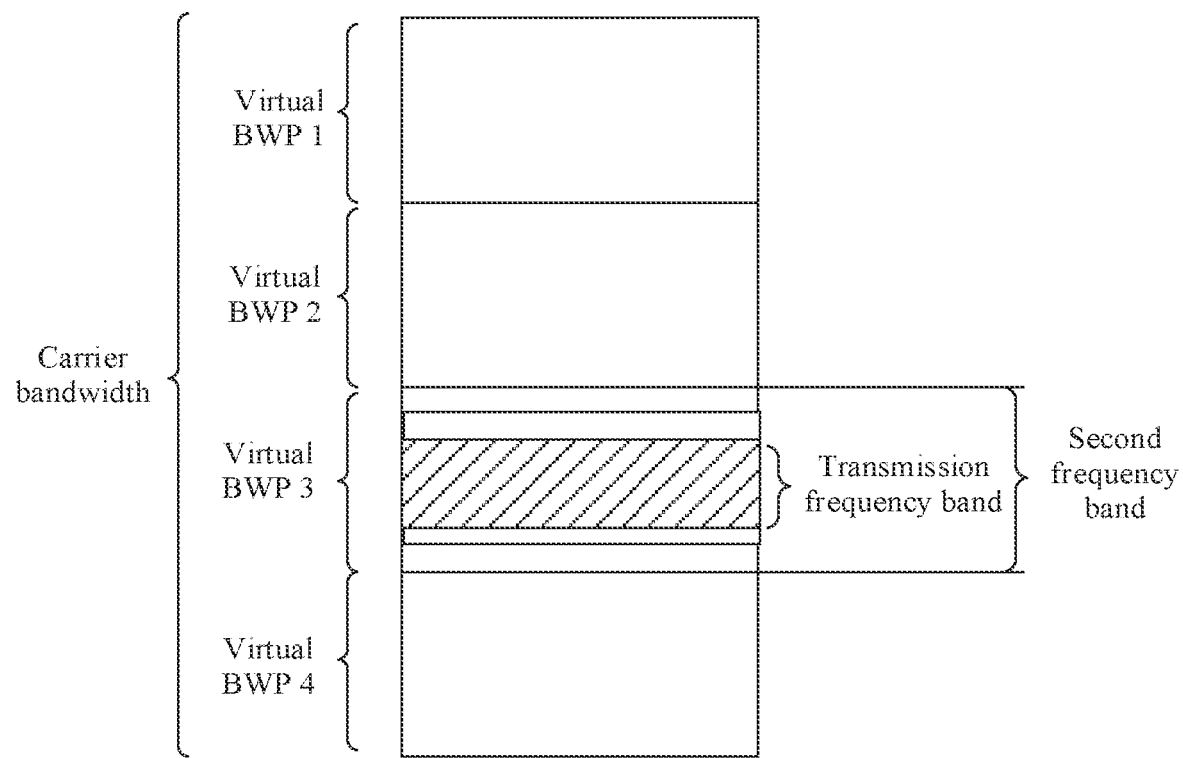
FIG. 7 is a schematic diagram of virtual BWPs distributed on a carrier bandwidth according to this application.

First, on one carrier, the network device configures the first frequency band for the terminal device (or in other words, configures the first frequency band information for the terminal device) by using RRC signaling. The first frequency band may be considered as a virtual BWP. It is assumed that the network device configures four virtual BWPs for the terminal device on a carrier whose carrier bandwidth is 50 MHz. In an NR system, considering impact of a guard bandwidth, a quantity of RBs that can be used for data transmission and that are included in a 50 MHz system carrier is 270 (it is assumed that a subcarrier spacing corresponding to the system carrier is 15 kHz). If frequency resources included in the four virtual BWPs do not overlap each other and occupy all carrier bandwidths, the bandwidths of the four virtual BWPs may be 68, 68, 67, and 67 RBs respectively. For example, FIG. 7 is a schematic diagram of virtual BWPs distributed in a carrier bandwidth.

Second, the network device indicates an index of an activated BWP to the terminal device by using physical layer signaling, for example, control information (such as DCI) carried on a physical downlink control channel. In this example, it is assumed that a virtual BWP 2 (that is, the first frequency band) is activated, and the second frequency band activated in the BWP 2 is indicated by the DCI. It should be noted that, in this application, behavior of the terminal device in the activated second frequency band is similar to behavior of the terminal device in the activated BWP described above. A difference lies in that, because the bandwidth of the second frequency band is equal to the maximum channel bandwidth supported by the terminal device, the terminal device and the network device can perform data transmission on all frequency domain resources of the activated second frequency band. Assuming that the maximum channel bandwidth supported by the terminal device is 5 MHz, the bandwidth of the second frequency band may alternatively be 5 MHz. Considering impact of a guard bandwidth, when SCS=15 kHz, a bandwidth that corresponds to the second frequency band and that is used to transmit data may be 25 RBs. It is assumed that data transmission between the terminal device and the network device is scheduled at a granularity of a resource block group (resource block group, RBG). To be specific, in this mode, a frequency resource used for data transmission between the terminal device and the network device is an integer multiple of an RBG. When one RBG includes four RBs, the network device may respectively indicate, by using two bits (bit) and four bits, an activated virtual BWP and second frequency bands included in the activated virtual BWP. When one RBG includes eight RBs, the network device may respectively indicate, by using two bits and three bits, an activated virtual BWP and second frequency bands included in the activated virtual BWP.

Finally, the network device may further indicate, by using the DCI, a specific data transmission resource in the activated second frequency band. It is assumed that data transmission between the terminal device and the network device is scheduled at a granularity of an RBG, and one RBG includes RBs continuous in frequency domain. In this case, when the RBG includes four RBs or eight RBs, a maximum of seven bits or four bits are required to indicate the scheduled frequency resource in the second frequency band. According to the foregoing process, because the second frequency band may dynamically change within a larger frequency resource range by using DCI signaling, a larger frequency selective scheduling gain may be obtained for data transmission of the terminal device. In conclusion, for a system whose carrier bandwidth is 50 MHz and an SCS is 15 kHz, if a data transmission manner in which a data scheduling granularity is an RBG is used, for a terminal device whose bandwidth capability is 5 MHz, when the RBG includes four RBs or eight RBs, a total of 13 bits or 9 bits are required to indicate frequency resources corresponding to data transmission of the terminal device. Compared with an implementation method in the conventional technology (in which 18 bits or 10 bits are required respectively), control overheads can be reduced, thereby improving data transmission efficiency.

For example, when the subcarrier spacing is 15 kHz, Table 2 shows quantities of physical layer bits required by using the scheduling resource indication method in this application and the frequency domain resource indication method in the conventional technology in different carrier bandwidths. The data transmission manner in which the data scheduling granularity is an RBG is used. An RBG size indicates a quantity of RBs included in one RBG.

TABLE 2

| Carrier bandwidth | 30 MHz | 40 MHz | 50 MHz |
|---|---|---|---|
| Virtual BWP bandwidth | 40 RBs | 54 RBs | 67 or 68 RBs |
| RBG size | 4 or 8 RBs | 4 or 8 RBs | 4 or 8 RBs |
| Bit overheads in this application | 11 or 7 bits | 12 or 8 bits | 13 or 9 bits |
| Bit overheads in the conventional technology | 11 or 6 bits | 15 or 8 bits | 18 or 10 bits |

According to the data transmission method provided in this embodiment of this application, the terminal device determines the first frequency band, receives the first information from the network device, where the first information is used to indicate the first transmission frequency band, determines the first transmission frequency band based on the first information, and transmits data to the network device in the first transmission frequency band. The bandwidth of the first frequency band is greater than the maximum channel bandwidth supported by the terminal device. The first transmission frequency band is used by the terminal device to transmit data. The first frequency band includes the first transmission frequency band. According to the foregoing method, the network device can dynamically schedule a terminal device with a low bandwidth capability within a larger frequency resource range, thereby obtaining a larger frequency selective scheduling gain and improving data transmission efficiency.

Figure 8:
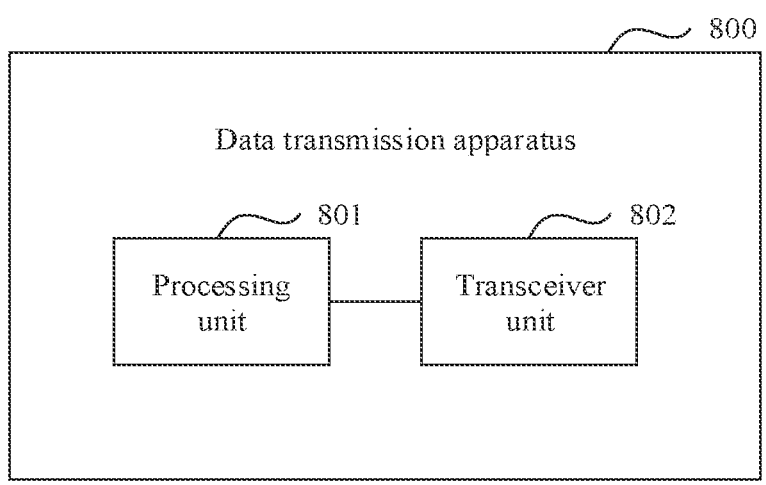
FIG. 8 is a schematic diagram of a structure of a data transmission apparatus according to this application.

Based on the foregoing embodiments, an embodiment of this application further provides a data transmission apparatus. The data transmission apparatus is applied to the communication system shown in FIG. 3, and is configured to implement the data transmission method shown in FIG. 4. Referring to FIG. 8, the data transmission apparatus 800 includes a processing unit 801 and a transceiver unit 802. The data transmission apparatus 800 may be a terminal device, configured to perform operations of the terminal device in the data transmission method shown in FIG. 4. The data transmission apparatus 800 may be a network device, configured to perform operations of the network device in the data transmission method shown in FIG. 4.

Specifically, in an embodiment, when the data transmission apparatus 800 is configured to perform the operations of the terminal device in the data transmission method shown in FIG. 4, the processing unit 801 is configured to determine a first frequency band, where a bandwidth of the first frequency band is greater than a maximum channel bandwidth supported by the terminal device.

The transceiver unit 802 is configured to receive first information from a network device, where the first information is used to indicate a first transmission frequency band, the first transmission frequency band is used by the terminal device to transmit data, and a bandwidth of the first transmission frequency band is smaller than or equal to the maximum channel bandwidth supported by the terminal device.

The processing unit 801 is further configured to determine the first transmission frequency band based on the first information, where the first frequency band includes the first transmission frequency band.

The transceiver unit 802 is further configured to transmit data to the network device in the first transmission frequency band.

Specifically, the bandwidth of the first frequency band is smaller than or equal to a carrier bandwidth.

In an optional manner, the transceiver unit 802 is further configured to receive second information from the network device, where the second information is used to indicate the first frequency band; and when determining the first frequency band, the processing unit 801 is specifically configured to determine the first frequency band based on the second information; or the first frequency band is predefined.

In an example, the transceiver unit 802 is further configured to receive third information from the network device, where the third information is used to indicate a second frequency band; and the processing unit 801 is further configured to determine the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band.

Specifically, the third information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In another example, the third information includes a first index, and the first index corresponds to the second frequency band in the first frequency band; and when determining the second frequency band based on the third information, the processing unit 801 is specifically configured to determine the second frequency band based on the first index and a correspondence between the first index and the second frequency band.

In another optional manner, the processing unit 801 is further configured to determine the second frequency band based on at least one of the following: a time location at which the terminal device transmits data, a corresponding hybrid automatic repeat request HARQ process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band. The second frequency band is included in the first frequency band, a bandwidth of the second frequency band is smaller than or equal to the maximum channel bandwidth supported by the terminal device, and the first transmission frequency band is a part or all of the second frequency band.

For example, the data is PDSCH data.

In a possible implementation, the processing unit 801 is further configured to obtain a first frequency band set, where the first frequency band set includes at least one of frequency bands corresponding to different data transmission types; and when determining the first frequency band, the processing unit 801 is specifically configured to determine the first frequency band based on a data transmission type and the first frequency band set.

The data transmission apparatus (the terminal device herein) provided in this embodiment of this application determines the first frequency band, receives the first information from the network device, where the first information is used to indicate the first transmission frequency band, determines the first transmission frequency band based on the first information, and transmits data to the network device in the first transmission frequency band. The bandwidth of the first frequency band is greater than the maximum channel bandwidth supported by the terminal device. The first transmission frequency band is used by the terminal device to transmit data. The first frequency band includes the first transmission frequency band. In this way, the network device can dynamically schedule a terminal device with a low bandwidth capability within a larger frequency resource range, thereby obtaining a larger frequency selective scheduling gain and improving data transmission efficiency.

In another embodiment, when the data transmission apparatus 800 is configured to perform the operations of the network device in the data transmission method shown in FIG. 4, the transceiver unit 802 is configured to send first information to a terminal device, where the first information is used to indicate a first transmission frequency band, the first transmission frequency band is used by the terminal device to transmit data, the first transmission frequency band is included in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device; and receive data from the terminal device in the first transmission frequency band.

The processing unit 801 is configured to control the transceiver unit 802 to send and receive data (or information, a signal, or the like).

Specifically, the bandwidth of the first frequency band is smaller than or equal to a carrier bandwidth.

In an optional implementation, the transceiver unit 802 is further configured to send second information to the terminal device, where the second information is used to indicate the first frequency band.

In a possible manner, the transceiver unit 802 is further configured to send third information to the terminal device, where the third information is used to indicate a second frequency band, the second frequency band is included in the first frequency band, a bandwidth of the second frequency band is smaller than or equal to the maximum channel bandwidth supported by the terminal device, and the first transmission frequency band is a part or all of the second frequency band.

In an example, the second information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In another example, the second information includes a first index, and the first index corresponds to the second frequency band in the first frequency band.

For example, the processing unit 801 is further configured to configure a second frequency band set for the terminal device, where the second frequency band set includes at least one of frequency bands corresponding to different data transmission types.

The data transmission apparatus (the network device herein) provided in this embodiment of this application sends the first information to the terminal device, where the first information is used to indicate the first transmission frequency band, and the first transmission frequency band is used by the terminal device to transmit data; and receives data from the terminal device in the first transmission frequency band, where the first transmission frequency band is included in the first frequency band, and the bandwidth of the first frequency band is greater than the maximum channel bandwidth supported by the terminal device. In this way, the network device can dynamically schedule a terminal device with a low bandwidth capability within a larger frequency resource range, thereby obtaining a larger frequency selective scheduling gain and improving data transmission efficiency.

It should be noted that, in the embodiments of this application, division into the units is an example and merely logical function division, and may be other division in an actual implementation. Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Figure 9:
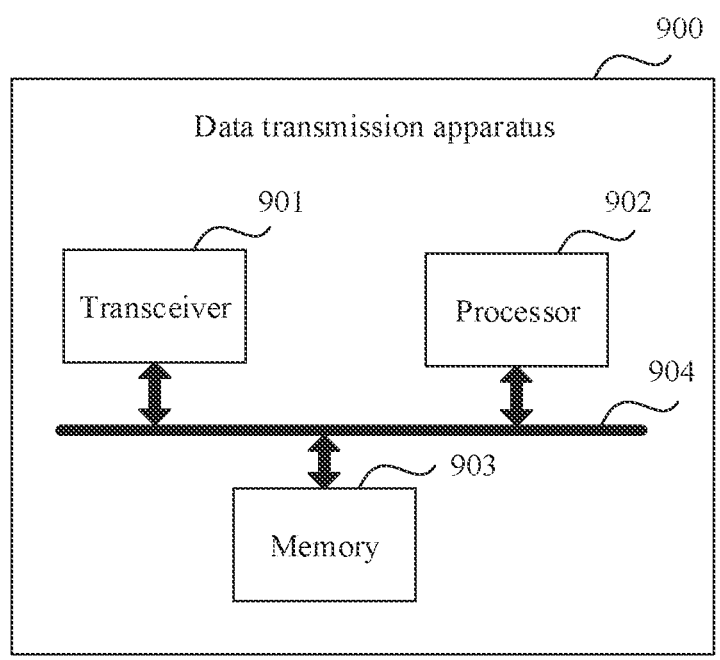
FIG. 9 is a diagram of a structure of a data transmission apparatus according to this application.

Based on the foregoing embodiments, an embodiment of this application further provides a data transmission apparatus. The data transmission apparatus is applied to the communication system shown in FIG. 3, and is configured to implement the data transmission method shown in FIG. 4. Referring to FIG. 9, the data transmission apparatus 900 may include a transceiver 901 and a processor 902, and optionally may further include a memory 903. The processor 902 may be a central processing unit (central processing unit, CPU), a network processor (network processor, NP), a combination of a CPU and an NP, or the like. The processor 902 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The processor 902 may implement the foregoing function by hardware or by hardware executing corresponding software.

The transceiver 901 and the processor 902 are connected to each other. Optionally, the transceiver 901 and the processor 902 are connected to each other by using a bus 904. The bus 904 may be a peripheral component interconnect (Peripheral Component Interconnect, PCI) bus, an extended industry standard architecture (Extended Industry Standard Architecture, EISA) bus, or the like. Buses may be classified into an address bus, a data bus, a control bus, and the like. For ease of representation, only one thick line is used to represent the bus in FIG. 9, but this does not mean that there is only one bus or only one type of bus.

The memory 903 is coupled to the processor 902, and is configured to store a program and the like necessary for the data transmission apparatus 900. For example, the program may include program code, and the program code includes computer operation instructions. The memory 903 may include a RAM, and may further include a non-volatile memory (non-volatile memory), for example, at least one magnetic disk memory. The processor 902 executes the application program stored in the memory 903, to implement functions of the data transmission apparatus 900.

The data transmission apparatus 900 may be a terminal device, configured to perform operations of the terminal device in the data transmission method shown in FIG. 4. The data transmission apparatus 900 may be a network device, configured to perform operations of the network device in the data transmission method shown in FIG. 4.

Specifically, in an embodiment, when the data transmission apparatus 900 is configured to perform the operations of the terminal device in the data transmission method shown in FIG. 4, the processor 902 is configured to determine a first frequency band, where a bandwidth of the first frequency band is greater than a maximum channel bandwidth supported by the terminal device.

The transceiver 901 is configured to receive first information from a network device, where the first information is used to indicate a first transmission frequency band, the first transmission frequency band is used by the terminal device to transmit data, and a bandwidth of the first transmission frequency band is smaller than or equal to the maximum channel bandwidth supported by the terminal device.

The processor 902 is further configured to determine the first transmission frequency band based on the first information, where the first frequency band includes the first transmission frequency band.

The transceiver 901 is further configured to transmit data to the network device in the first transmission frequency band.

Specifically, the bandwidth of the first frequency band is smaller than or equal to a carrier bandwidth.

In an optional implementation, the transceiver 901 is further configured to receive second information from the network device, where the second information is used to indicate the first frequency band; and when determining the first frequency band, the processor 902 is specifically configured to determine the first frequency band based on the second information; or the first frequency band is predefined.

In a possible implementation, the transceiver 901 is further configured to receive third information from the network device, where the third information is used to indicate a second frequency band; and the processor 902 is further configured to determine the second frequency band based on the third information, where the second frequency band is included in the first frequency band, a bandwidth of the second frequency band is smaller than or equal to the maximum channel bandwidth supported by the terminal device, and the first transmission frequency band is a part or all of the second frequency band.

In an example, the third information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In another example, the third information includes a first index, and the first index corresponds to the second frequency band in the first frequency band; and when determining the second frequency band based on the third information, the processor 902 is specifically configured to determine the second frequency band based on the first index and a correspondence between the first index and the second frequency band.

In another possible implementation, the processor 902 is further configured to determine the second frequency band based on at least one of the following: a time location at which the terminal device transmits data, a corresponding hybrid automatic repeat request HARQ process through which the terminal device transmits data, a corresponding quantity of transmissions of data transmitted by the terminal device, or information related to the first frequency band in which the second frequency band is located. The information related to the first frequency band in which the second frequency band is located is an index of the first frequency band or a frequency domain resource location corresponding to the first frequency band.

The second frequency band is included in the first frequency band, a bandwidth of the second frequency band is smaller than or equal to the maximum channel bandwidth supported by the terminal device, and the first transmission frequency band is a part or all of the second frequency band.

Specifically, the data is PDSCH data.

In an example implementation, the processor 902 is further configured to obtain a first frequency band set, where the first frequency band set includes at least one of frequency bands corresponding to different data transmission types; and when determining the first frequency band, the processor 902 is specifically configured to determine the first frequency band based on a data transmission type and the first frequency band set.

The data transmission apparatus (the terminal device herein) provided in this embodiment of this application determines the first frequency band, receives the first information from the network device, where the first information is used to indicate the first transmission frequency band, determines the first transmission frequency band based on the first information, and transmits data to the network device in the first transmission frequency band. The bandwidth of the first frequency band is greater than the maximum channel bandwidth supported by the terminal device. The first transmission frequency band is used by the terminal device to transmit data. The first frequency band includes the first transmission frequency band. In this way, the network device can dynamically schedule a terminal device with a low bandwidth capability within a larger frequency resource range, thereby obtaining a larger frequency selective scheduling gain and improving data transmission efficiency.

In another embodiment, when the data transmission apparatus 800 is configured to perform the operations of the network device in the data transmission method shown in FIG. 4, the transceiver 901 is configured to send first information to a terminal device, where the first information is used to indicate a first transmission frequency band, the first transmission frequency band is used by the terminal device to transmit data, the first transmission frequency band is included in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device; and receive data from the terminal device in the first transmission frequency band.

The processor 902 is configured to control the transceiver 901 to send and receive data (or information, a signal, or the like).

Specifically, the bandwidth of the first frequency band is smaller than or equal to a carrier bandwidth.

In an optional implementation, the transceiver 901 is further configured to send second information to the terminal device, where the second information is used to indicate the first frequency band.

In a specific implementation, the transceiver 901 is further configured to send third information to the terminal device, where the third information is used to indicate a second frequency band, the second frequency band is included in the first frequency band, a bandwidth of the second frequency band is smaller than or equal to the maximum channel bandwidth supported by the terminal device, and the first transmission frequency band is a part or all of the second frequency band.

In an example, the second information includes at least a frequency domain resource location corresponding to the second frequency band; and the frequency domain resource location corresponding to the second frequency band is a frequency domain start location corresponding to the second frequency band and the bandwidth of the second frequency band, or the frequency domain resource location corresponding to the second frequency band is a frequency domain start location and a frequency domain end location of the second frequency band, or the frequency domain resource location corresponding to the second frequency band is a frequency domain start location of the second frequency band, or the frequency domain resource location corresponding to the second frequency band is a frequency domain end location of the second frequency band, or the frequency domain resource location corresponding to the second frequency band is an offset of the second frequency band relative to a frequency domain start location of the first frequency band in the first frequency band, or the frequency domain resource location corresponding to the second frequency band is an offset of the second frequency band relative to a frequency domain end location of the first frequency band in the first frequency band.

In another example, the second information includes a first index, and the first index corresponds to the second frequency band in the first frequency band.

In a possible implementation, the processor 902 is further configured to configure a second frequency band set for the terminal device, where the second frequency band set includes at least one of frequency bands corresponding to different data transmission types.

The data transmission apparatus (the network device herein) provided in this embodiment of this application sends the first information to the terminal device, where the first information is used to indicate the first transmission frequency band, and the first transmission frequency band is used by the terminal device to transmit data; and receives data from the terminal device in the first transmission frequency band, where the first transmission frequency band is included in the first frequency band, and the bandwidth of the first frequency band is greater than the maximum channel bandwidth supported by the terminal device. In this way, the network device can dynamically schedule a terminal device with a low bandwidth capability within a larger frequency resource range, thereby obtaining a larger frequency selective scheduling gain and improving data transmission efficiency.

In conclusion, according to the data transmission methods and apparatuses provided in the embodiments of this application, the terminal device determines the first frequency band, receives the first information from the network device, where the first information is used to indicate the first transmission frequency band, determines the first transmission frequency band based on the first information, and transmits data to the network device in the first transmission frequency band. The bandwidth of the first frequency band is greater than the maximum channel bandwidth supported by the terminal device. The first transmission frequency band is used by the terminal device to transmit data. The first frequency band includes the first transmission frequency band. According to the foregoing method, the network device can dynamically schedule a terminal device with a low bandwidth capability within a larger frequency resource range, thereby obtaining a larger frequency selective scheduling gain and improving data transmission efficiency.

It should be noted that the signaling in the embodiments of this application may be carried in one or more of a physical downlink control channel, a physical downlink shared channel, or a signal. This is not limited in this application. For example, the signal may be a demodulation reference signal (demodulation reference signal, DMRS), a CSI-RS, or the like.

It should be noted that although the foregoing embodiments are described by using a terminal device with a low bandwidth capability as an example, the data transmission method provided in this application may also be applied to a backward-incompatible terminal device, for example, a terminal device of NR Release (release) 17 or a release later than NR Release (release) 17, or a terminal device in a future communication system. This is not limited in this application.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Definitely, a person skilled in the art can make various modifications and variations to the embodiments of this application without departing from the scope of the embodiments of this application. In this case, this application is intended to cover these modifications and variations provided that they fall within the scope of protection defined by the following claims and their equivalent technologies.

What is claimed is:

1. A data transmission method, comprising:
   determining, by a terminal device, a first frequency band, wherein a bandwidth of the first frequency band is greater than a maximum channel bandwidth supported by the terminal device;
   receiving, by the terminal device, first information from a network device, wherein the first information indicates a first transmission frequency band, a bandwidth of the first transmission frequency band is smaller than or equal to the maximum channel bandwidth supported by the terminal device, and the first transmission frequency band is used by the terminal device to transmit traffic data;
   receiving, by the terminal device, third information from the network device, wherein the third information indicates a second frequency band;
   determining, by the terminal device, the first transmission frequency band based on the first information, wherein the first frequency band comprises the first transmission frequency band;
   determining, by the terminal device, the second frequency band based on the third information, wherein the second frequency band is comprised in the first frequency band, a bandwidth of the second frequency band is smaller than or equal to the maximum channel bandwidth supported by the terminal device, and the first transmission frequency band is a part or all of the second frequency band; and
   transmitting, by the terminal device, traffic data to the network device in the first transmission frequency band.

2. The method according to claim 1, wherein
   the bandwidth of the first frequency band is smaller than or equal to a carrier bandwidth.

3. The method according to claim 1, wherein the determining, by a terminal device, a first frequency band comprises:
   receiving, by the terminal device, second information from the network device, wherein the second information indicates the first frequency band, and determining, by the terminal device, the first frequency band based on the second information; or
   the first frequency band is predefined.

4. The method according to claim 1, wherein
   the third information comprises at least a frequency domain resource location corresponding to the second frequency band; and the frequency domain resource location corresponding to the second frequency band is one of the following:
   a frequency domain start location corresponding to the second frequency band and the bandwidth of the second frequency band;
   the frequency domain resource location corresponding to the second frequency band is a frequency domain start location and a frequency domain end location of the second frequency band;
   a frequency domain start location of the second frequency band;
   a frequency domain end location of the second frequency band;
   an offset of the second frequency band relative to a frequency domain start location of the first frequency band in the first frequency band; or
   an offset of the second frequency band relative to a frequency domain end location of the first frequency band in the first frequency band.

5. A data transmission method, comprising:
   sending, by a network device, first information to a terminal device, wherein the first information indicates a first transmission frequency band, the first transmission frequency band is used by the terminal device to transmit traffic data, the first transmission frequency band is comprised in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device;

sending, by the network device, third information to the terminal device, wherein the third information indicates a second frequency band, the second frequency band is comprised in the first frequency band, a bandwidth of the second frequency band is smaller than or equal to the maximum channel bandwidth supported by the terminal device, and the first transmission frequency band is a part or all of the second frequency band; and receiving, by the network device, traffic data from the terminal device in the first transmission frequency band.

6. The method according to claim 5, wherein
the bandwidth of the first frequency band is smaller than or equal to a carrier bandwidth.

7. The method according to claim 5, wherein the method further comprises:

sending, by the network device, second information to the terminal device, wherein the second information indicates the first frequency band.

8. The method according to claim 5, wherein
the third information comprises at least a frequency domain resource location corresponding to the second frequency band; and the frequency domain resource location corresponding to the second frequency band is one of the following:
 a frequency domain start location corresponding to the second frequency band and the bandwidth of the second frequency band;
 a frequency domain start location and a frequency domain end location of the second frequency band;
 a frequency domain start location of the second frequency band;
 a frequency domain end location of the second frequency band;
 an offset of the second frequency band relative to a frequency domain start location of the first frequency band in the first frequency band; or
 an offset of the second frequency band relative to a frequency domain end location of the first frequency band in the first frequency band.

9. A data transmission apparatus, comprising:
a transceiver,
at least one processor; and
one or more memories coupled to the at least one processor and storing programming instructions for execution by the at least one processor to cause the apparatus to:
determine a first frequency band, wherein a bandwidth of the first frequency band is greater than a maximum channel bandwidth supported by the apparatus;
receive, by using the transceiver, first information from a network device, wherein the first information indicates a first transmission frequency band, a bandwidth of the first transmission frequency band is smaller than or equal to the maximum channel bandwidth supported by the apparatus, and the first transmission frequency band is used by the apparatus to transmit traffic data;
receive, by using the transceiver, third information from the network device, wherein the third information indicates a second frequency band;

determine the first transmission frequency band based on the first information, wherein the first frequency band comprises the first transmission frequency band;

determine the second frequency band based on the third information, wherein the second frequency band is comprised in the first frequency band, a bandwidth of the second frequency band is smaller than or equal to the maximum channel bandwidth supported by the apparatus, and the first transmission frequency band is a part or all of the second frequency band; and transmit, by using the transceiver, traffic data to the network device in the first transmission frequency band.

10. The apparatus according to claim 9, wherein
the bandwidth of the first frequency band is smaller than or equal to a carrier bandwidth.

11. The apparatus according to claim 9, wherein
the programming instructions, when executed by the at least one processor, cause the apparatus to receive, by using the transceiver, second information from the network device, wherein the second information indicates the first frequency band, and determine the first frequency band based on the second information; or
the first frequency band is predefined.

12. The apparatus according to claim 9, wherein
the third information comprises at least a frequency domain resource location corresponding to the second frequency band; and the frequency domain resource location corresponding to the second frequency band is one of the following:
 a frequency domain start location corresponding to the second frequency band and the bandwidth of the second frequency band;
 a frequency domain start location and a frequency domain end location of the second frequency band;
 a frequency domain start location of the second frequency band;
 a frequency domain end location of the second frequency band;
 an offset of the second frequency band relative to a frequency domain start location of the first frequency band in the first frequency band; or
 an offset of the second frequency band relative to a frequency domain end location of the first frequency band in the first frequency band.

13. A data transmission apparatus, comprising:
a transceiver,
at least one processor; and
one or more memories coupled to the at least one processor and storing programming instructions for execution by the at least one processor to cause the apparatus to:
send, by using the transceiver, first information to a terminal device, wherein the first information indicates a first transmission frequency band, the first transmission frequency band is used by the terminal device to transmit traffic data, the first transmission frequency band is comprised in a first frequency band, a bandwidth of the first frequency band is greater than a maximum channel bandwidth supported by the terminal device, and a bandwidth of the first transmission frequency band is smaller than or equal to the maximum channel bandwidth supported by the terminal device;
send, by using the transceiver, third information to the terminal device, wherein the third information indicates a second frequency band, the second frequency band is comprised in the first frequency band, a bandwidth of the second frequency band is smaller than or equal to the maximum channel bandwidth supported by the terminal device, and the first transmission frequency band is a part or all of the second frequency band; and receive, by using the transceiver, traffic data from the terminal device in the first transmission frequency band.

14. The apparatus according to claim 13, wherein the bandwidth of the first frequency band is smaller than or equal to a carrier bandwidth.

15. The apparatus according to claim 13, wherein the programming instructions, when executed by the at least one processor, cause the apparatus to:

send, by using the transceiver, second information to the terminal device, wherein the second information indicates the first frequency band.

16. The apparatus according to claim 13, wherein the third information comprises at least a frequency domain resource location corresponding to the second frequency band; and the frequency domain resource location corresponding to the second frequency band is one of the following:

a frequency domain start location corresponding to the second frequency band and the bandwidth of the second frequency band;

a frequency domain start location and a frequency domain end location of the second frequency band;

a frequency domain start location of the second frequency band;

a frequency domain end location of the second frequency band;

an offset of the second frequency band relative to a frequency domain start location of the first frequency band in the first frequency band; or an offset of the second frequency band relative to a frequency domain end location of the first frequency band in the first frequency band.

* * * * *